United States Patent [19]

Besson et al.

[11] Patent Number: 4,558,268

[45] Date of Patent: Dec. 10, 1985

[54] CONTROL DEVICE FOR TWO BIDIRECTIONAL STEP MOTORS

[75] Inventors: René Besson, Neuchatel, Switzerland; Yves Guérin, St-Louis, France

[73] Assignee: ETA S.A., Fabriques d'Ebauches, Granges, Switzerland

[21] Appl. No.: 611,770

[22] Filed: May 18, 1984

[30] Foreign Application Priority Data

Jun. 29, 1983 [CH] Switzerland .......................... 3548/83

[51] Int. Cl.[4] .............................................. H02K 29/04

[52] U.S. Cl. ..................................... 318/696; 318/685; 368/157

[58] Field of Search ............... 318/685, 696, 562, 563; 368/157

[56] References Cited

U.S. PATENT DOCUMENTS 4,055,786 10/1977 Di Marzio ........................... 318/562

FOREIGN PATENT DOCUMENTS 2058414 4/1983 United Kingdom .

*Primary Examiner*—William M. Shoop, Jr.
*Assistant Examiner*—Saul M. Bergmann
*Attorney, Agent, or Firm*—Pollock, Vande Sande & Priddy

[57] ABSTRACT

The device includes two driving circuit ($C_1$, $C_2$) each of which includes six power transistors ($T_{11}$–$T_{16}$, $T_{21}$–$T_{26}$) that are connected in pairs into three parallel circuit branches. A first coil ($B_{11}$) of one of the motors and a first coil ($B_{21}$) of the other are, on the one hand, both connected to the junctions of the transistors of one of the branches of one of the driving circuits ($C_1$) and, on the other hand, respectively connected to the junctions of the transistors of the two other branches of this circuit. The same applies for the second coils ($B_{12}$, $B_{22}$) of the motors and the other driving circuit ($C_2$). The various transistors are controlled so that the two coils of the same motor simultaneously receive the current pulses which are needed to make it turn but by preventing the simultaneous application of current pulses to a coil from one of the motors and to a coil from the other.

This arrangement makes it possible to save four transistors and two output terminals on the integrated circuit used to control the motors.

2 Claims, 3 Drawing Figures

CONTROL DEVICE FOR TWO BIDIRECTIONAL STEP MOTORS

DESCRIPTION

1. Technical Field

This invention pertains to a control device for a pair of bidirectional step motors, each of which includes two coils. The control device can be used in an electronic analog-type watch, although there are other applications.

2. Background Art

We can equip a watch with two step motors for various reasons, for instance to increase the number of functions which the watch can perform or indications that it can supply in comparison to a watch with one motor and the same display arrangement. Another reason is to allow for easy electronic corrections of data that the watch displays. Both reasons can be satisfied at the same time.

The use of two motors can sometimes be justified for the sole reason that two motors make it possible to provide a watch with the same functions as another, with a single motor, but which is simpler both in terms of assembly and use.

For instance, there are watches in which a first motor drives a second hand and a minutes hand while a second motor drives the hour hand and a calendar display. Such an arrangement makes it possible to set the time quickly, to change time zones rapidly and to easily incorporate a chronographic function.

This solution also has another advantage: the energy consumption is much smaller than if the watch had only one motor supplied by fixed length driving pulses. Indeed, the motor which only drives the second and minute hands is therefore subjected to a small load and can be supplied by low energy driving pulses. On the other hand, the motor which drives the calendar mechanism needs higher energy pulses, in smaller numbers, for instance about twelve per hour. This makes it possible, with two motors, to increase the life time of the battery or to reduce its size.

It is also known, for a watch with only the three usual hands, that the one for seconds is driven on the one hand, and the ones for minutes and hours on the other. The latter two can also act to adjust and display on command an alarm time, while the seconds hand is used to indicate with a particular motion that the displayed time is the one for the alarm.

Whether we must achieve faster correction of data supplied by the watch or the hands must find a short cut to go from one position to another when they are being used to indicate other than the present time, it is always preferable to use bidirectional motors.

At present in the clockmaking area we have several possibilities to provide a bidirectional motor. One solution involves continuing to use a standard single phase motor, for instance the Lavet kind, which is designed to turn only in one direction, and to add to it a control circuit which can produce and apply to it adequate driving pulses to make it turn in both directions.

Another possibility is to turn to a specially designed step motor which turns in both directions and especially to a two coil motor.

The use of this type of motor raises problems especially when we must include several inside one watch. Indeed, in most cases, the design of the motor requires that the two coils be excited in turn in order to trigger rotor rotation in one direction or another. Each coil therefore must be arranged so as to supply, by itself, the energy which is needed for this rotation, or that each coil must nearly possess the same volume as that of a standard unidirectional step motor. On the other hand, there are motors like the one which is described in the U.S. Pat. No. 4,371,821, in which the two coils can be excited simultaneously and both contribute to form the magnetic field that produces the torque which is applied to the rotor. Hence, the overall volume of the coils can be substantially reduced in relation to the volume of the coils which are alternately supplied and that volume can be almost equal to that of the single coil of a unidirectional step motor.

However, the simultaneous supply of the two coils implies that the current direction which flows into one of them is reversed more or less in the middle of the driving pulse that is applied to it. The control circuit of the motor must therefore necessarily include eight power transistors to create two bridges consisting of four transistors, in which the two coils are respectively branched. For a two motor watch this number of transistors should theoretically be multiplied by two. This is a disadvantage because we know that, contrary to the logic circuits which control them, the power transistors take up a large area on the integrated circuit of the watch.

The use of motors in which the coils are excited in turn is in this respect more advantageous because, as it is stated in the U.K. Pat. No. 2,058,414, it is possible then to plan for only six transistors to supply the two coils of a motor. Furthermore, the number of output terminals of the integrated circuit which are reserved for the supply of the coils can be reduced to three per motor instead of four. It is always desirable to restrict as much as possible the number of terminals in an integrated circuit in order to improve its reliability and to reduce its cost.

This invention is designed to supply a control device for two bidirectional step motors, each with two coils which make it possible to simultaneously supply the two coils in the same motor with a reduced number of power transistors and to restrict the number of terminals of the circuit in which the transistors are integrated with the electronic components that are used to control them.

This goal is reached because the control device according to the invention includes:

two supply terminals between which an electric energy source can be connected;

a first driving circuit which includes three circuit branches are connected in parallel between the supply terminals, each branch including two series transistors which can be controlled to apply polarized current pulses respectively to a first coil of one of the motors and to a first coil of the other motor, the first coils being, on the one hand, both connected to the junction of the transistors of one of the branches and, on the other hand, respectively connected to the junctions of the transistors of the other two branches;

a second driving circuit which also includes three branches which are connected in parallel between the supply terminals, each branch including two series transistors which can be controlled to apply polarized current pulses to the second coils of the motors, the second coils being, on the one hand, both connected to the junction of the transistors of one of the branches of the second circuit, and, on the other hand, respectively connected to the junctions of the transistors of the two other branches; and means to apply separately control signals to each transistor of the first and second driving circuits so that the two coils of a motor simultaneously receive the needed current pulses to make the motor turn and so as to prevent the simultaneous application of current pulses to a coil of one of the motors and to a coil of the other.

BRIEF DESCRIPTION OF THE DRAWINGS

The characteristics and advantages of the control device according to the invention will be better understood when reading the description which follows of an implementation example, that is provided in reference to the attached drawings in which.

DETAILED DESCRIPTION

Figure 1:
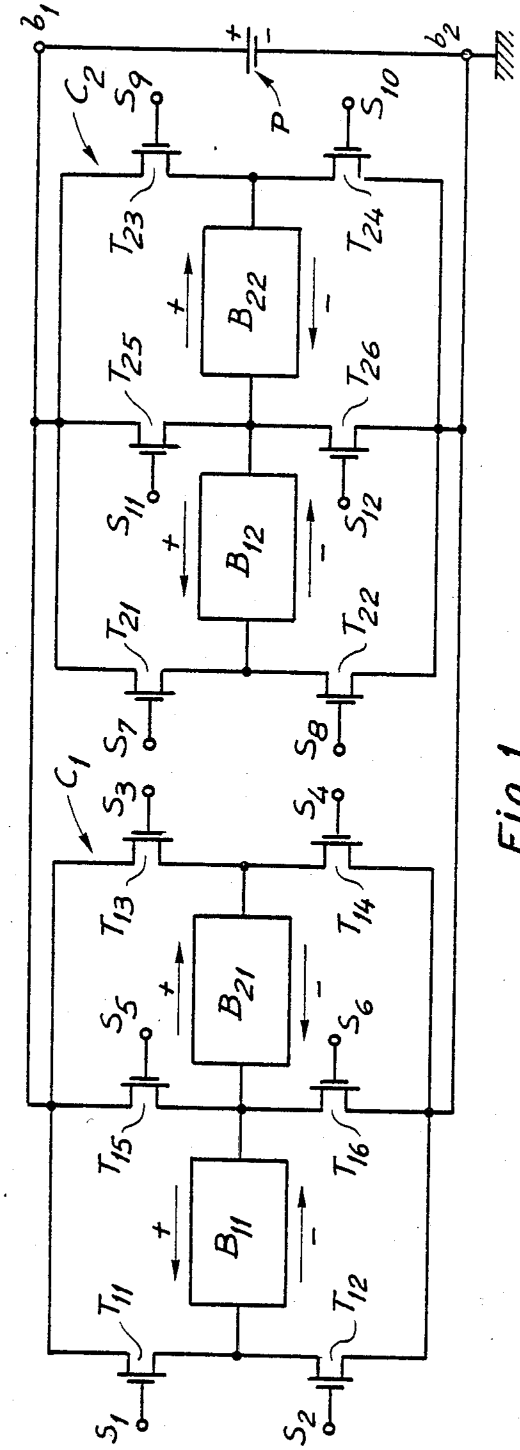
FIG. 1 is a circuit diagram which illustrates this implementation of the invention.

As is shown in FIG. 1, the control device according to the invention includes two driving circuits $C_1$ and $C_2$ which each include three parallel connected branches between two supply terminals $b_1$ and $b_2$ that are respectively connected to the positive pole and to the negative pole of an electric energy source P, for instance a battery.

Each of the six branches is comprised of two complementary MOS field effect transistors that are connected in series, the drains from these transistors being connected together and their respective sources connected to the supply terminals $b_1$ and $b_2$. In FIG. 1, the P channel transistors bear the references $T_{11}$, $T_{13}$, $T_{15}$ for the first driving circuit $C_1$ and $T_{21}$, $T_{23}$, $T_{25}$ for the second driving circuit $C_2$. The N channel transistors are referred to as $T_{12}$, $T_{14}$, $T_{16}$ in circuit $C_1$ and as $T_{22}$, $T_{24}$, $T_{26}$ in circuit $C_2$.

A first coil $B_{11}$ of one of the step motors to be controlled is coupled between the junction of the drains of transistors $T_{11}$ and $T_{12}$ and that of the drains of transistors $T_{15}$ and $T_{16}$. A first coil $B_{21}$ of the second motor is connected between the junction of the drains of transistors $T_{15}$ and $T_{16}$ and that of the drains of transistors $T_{13}$ and $T_{14}$. Moreover, the second coils $B_{12}$ and $B_{22}$ of the two motors are, on the one hand, both connected, to the junction of transistors $T_{25}$ and $T_{26}$ and, on the other hand, respectively connected to the junctions between transistors $T_{21}$ and $T_{22}$ and between transistors $T_{23}$ and $T_{24}$.

The motors to which the four coils $B_{11}$, $B_{12}$, $B_{21}$ and $B_{22}$ belong are not depicted in the drawing because those motors may be any kind of bidirectional motor with two coils which can or must be supplied simultaneously and for which the current direction must be reversed at least once in at least one of the coils for the length of time of the driving pulses. Furthermore, these two motors can be different.

The control terminals of transistors $T_{11}$ through $T_{16}$ and $T_{21}$ through $T_{26}$ receive control signals from a control circuit which is not depicted in FIG. 1 but of which an example will be provided later. The control signals have fixed length and are polarized so as to block or to render the desired transistors conductive so that each motor turns at the desired frequency and direction, while avoiding both motors functioning simultaneously.

In order to make transistors $T_{11}$, $T_{13}$, $T_{15}$, $T_{21}$, $T_{23}$ and $T_{25}$ conductive, the control circuit must apply to the control terminal of each of them a logic "0" signal. A logic "1" signal will block these transistors. However, the control circuit must apply to the control terminals of transistors $T_{12}$, $T_{14}$, $T_{16}$, $T_{22}$, $T_{24}$, $T_{26}$ a logic "0" signal to block them and a logic "1" signal to make them conductive. As it is usual in logic circuits, we define the logic signal "0", and "1" respectively, as a signal with the same voltage as the negative, and positive pole, respectively of the energy source P.

Furthermore, in order to make a positive current pass into coil $B_{11}$, $B_{12}$, respectively, in the direction of the arrow designated by +, the control circuit must render transistors $T_{12}$ and $T_{15}$, $T_{22}$ and $T_{25}$, respectively, conductive. On the other hand, in order to make a negative current pass into these same coils, the control circuit must render transistors $T_{11}$ and $T_{16}$, $T_{21}$ and $T_{26}$, respectively, conductive.

Furthermore, in order for a positive current to flow into coil $B_{21}$, $B_{22}$, respectively, we must render transistors $T_{14}$ and $T_{15}$, $T_{24}$ and $T_{25}$, respectively conductive. In order to provide a negative current to flow into the same coils, we must render transistors $T_{13}$ and $T_{16}$, $T_{23}$ and $T_{26}$, respectively conductive.

Moreover, it may be advantageous, as in the case of a standard unidirectional motor, to short-circuit for awhile at least one of the coils of the motor which has just received driving pulses, in order to reduce the length of time of rotor oscillations around its stable position. For this, the control circuit must render a pair of N or P channel transistors conductive, the particular pair is the pair, the drains of which are directly connected to the coil to be short-circuited.

The device which has just been described makes it possible to simultaneously control the coils of each motor in the same way as if the four coils were branched to a bridge consisting of four transistors, by using only twelve power transistors which all take up substantially the same surface on the integrated circuit and by saving two output terminals for that circuit.

The only limitation is that the two motors cannot operate at the same time. Actually, this is not a disadvantage, or at least in the instance of a watch where a shift of several milliseconds between the moves of two hands that are not driven by the same motor is not bothersome. On the other hand, even when it is possible to simultaneously control two motors, it is preferable not to do so because the current peaks that it might produce from relatively significant current consumption by the motors might disturb the operation of the integrated circuit. Furthermore, there might be a mutual influence from one motor on the other as a result of magnetic fields generated by the coils.

Figure 2:
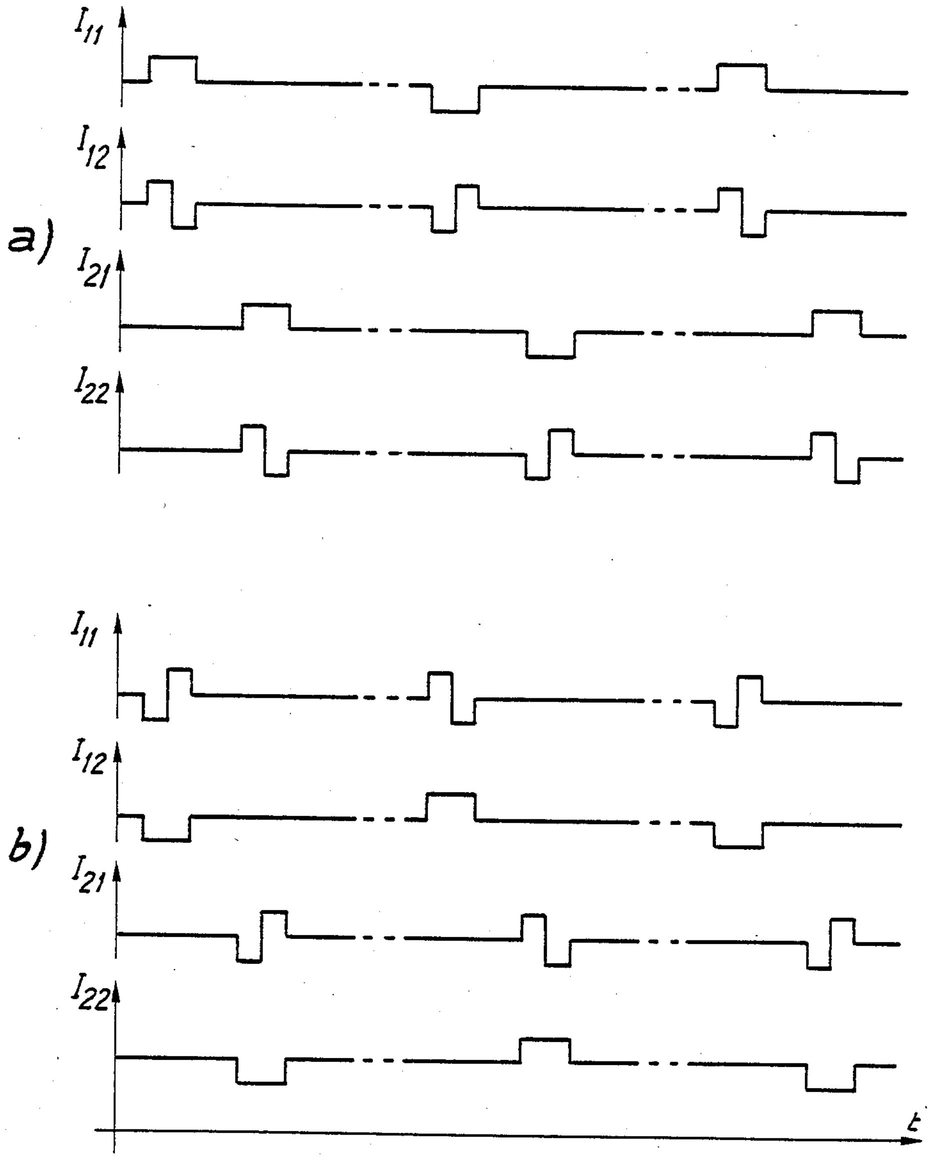
FIG. 2 is a diagram that shows current pulses which can be used to control two motors like the one which is described in the previously mentioned German patent application and with which the circuit of FIG. 1 can be associated.

FIG. 2 shows the shape of current pulses that the driving circuits $C_1$ and $C_2$ of FIG. 1 have to apply to coils $B_{11}$, $B_{12}$, $B_{21}$, $B_{22}$ when it involves controlling two motors like the one described in the U.S. Pat. No. 4,371,821 which was mentioned previously and that turn with 180° steps. This diagram takes into account the selection which is made in this patent application for the positive and negative directions of the currents inside the coils.

Part a of FIG. 2 corresponds to a case where the motors are both turning in the same direction, for instance forward, whereas part b corresponds to a case where the motors are both operating in reverse. Obviously, this does not exclude the possibility of making one of the motors turn forward while the other is operating in reverse.

In order to make the first motor turn with a forward step, when its rotor takes a given rest position, we simply need to first send simultaneously to the two coils $B_{11}$ and $B_{12}$ positive currents $I_{11}$ and $I_{12}$ and then to reverse, when the rotor has turned by about 90°, the direction of current $I_{12}$ which becomes negative, without changing the direction of current $I_{11}$.

In order to make the motor perform a new step in the same direction, we must first send in the two coils $B_{11}$ and $B_{12}$, negative currents then, when the rotor has turned by about half a step ( about 90°), we must reverse the direction of current $I_{12}$ in the second coil $B_{12}$.

Naturally, the same applies for the second motor. We must simply ensure that the currents $I_{21}$ and $I_{22}$ are sent respectively to the first coil, $B_{21}$, and to the second coil, $B_{22}$ of the second motor, only when the coils of the first motor are not supplied. It should be noted however that the coils of the first motor can be short-circuited while driving the second motor and vice versa.

In order to make the motors turn in reverse, by starting from the same rest position as previously described for the rotors, we must begin by sending to the two coils negative currents $I_{11}$, $I_{12}$, respectively $I_{21}$, $I_{22}$, then when the rotors have turned by half a step, we must reverse the direction of the current in the first coils.

A new step is effected in the same direction when the second coils receive positive currents and the second coils positive, then negative currents.

In FIGS. 2, the driving pulses that are applied to the two motors are depicted as being of the same frequency and of the same length. It is clear that it will not always be the case. For instance, in the watch which we discussed previously where a first motor drives a second hand and a minute hand, while a second motor drives an hour hand as well as a calendar display, during normal operation, the first motor receives driving pulses every second and the second only every five minutes if the hour hand is driven by twelve steps per hour. Furthermore, the length of the pulses is longer for the second motor than for the first, since the second motor must drive a calendar mechanism.

Figure 3:
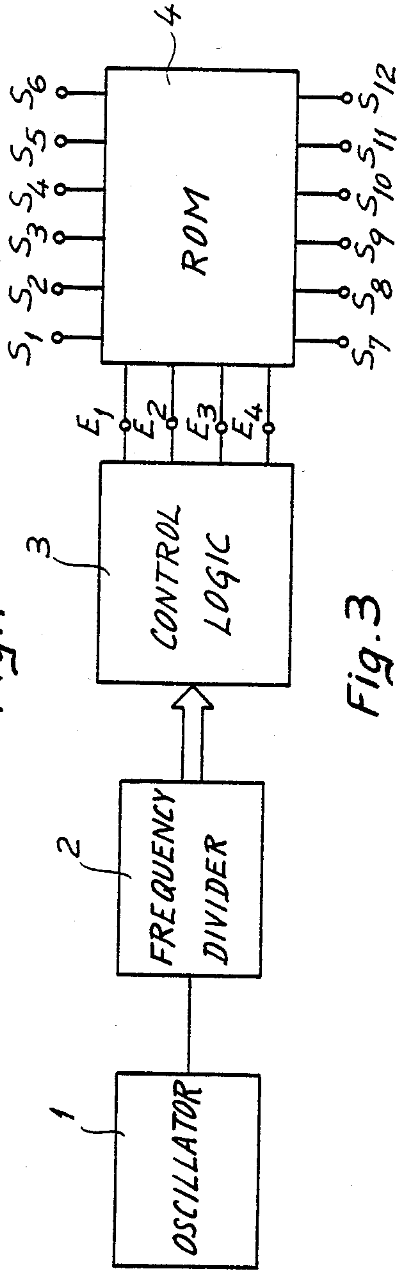
FIG. 3 represents, in the form of a block diagram, a circuit, which in the case of the application of the invention to an electronic watch, can be associated with that of FIG. 1 to control two motors with driving pulses such as the ones which are depicted in FIG. 2.

FIG. 3 schematically depicts an example of a control circuit which can be used inside a watch, with the circuits of FIG. 1, in order to control two motors that are similar to the motor of the previously mentioned U.S. patent.

In this example, the control signals of transistors $T_{11}$ through $T_{16}$ and $T_{21}$ through $T_{26}$ (see FIG. 1) are applied by memory 4, which may be a ROM, including six outputs, $S_1$ through $S_6$, directly connected to the control terminals of transistors $T_{11}$ through $T_{16}$ of the first driving circuit $C_1$ and six other outputs, $S_7$ through $S_{12}$, which are also directly connected to the control terminals of transistors $T_{21}$ through $T_{26}$ of the second driving circuit $C_2$. This memory also includes four address inputs, $E_1$ through $E_4$, which are designed to receive logic signals of which each combination corresponds to a blocking, short-circuiting or passage state for a positive or a negative current of the various coils $B_{11}$, $B_{12}$, $B_{21}$, $B_{22}$.

The control circuit also includes an oscillator 1 which includes a quartz resonator and its maintaining circuit, a frequency divider 2, and a control logic 3 which fashions, from signals of various frequencies that are issued by the divider and from signals produced by control means which are not depicted, the logic signals which must be applied to the input of the memory 4.

The oscillator 1 and the divider 2 are conventional. With respect to the control logic, it cannot be described in detail because it depends on the function which is assigned to each motor and on the characteristics of the automatic or manual means which are provided in order to control those functions.

The table below sums up the operation of the circuit in the simple case, where, first of all, the two coils of each motor are short-circuited for a given time after the application of driving pulses to that motor and where, secondly, the coils from one of the motors are supplied and short-circuited only when the coils from the other motor are open (neither supplied with current nor short-circuited).

| | STATES | | | | INPUTS | | | | OUTPUTS | | | | | | | | | | | |
|---|---|---|---|---|---|---|---|---|---|---|---|---|---|---|---|---|---|---|---|---|
| | $B_{11}$ | $B_{12}$ | $B_{21}$ | $B_{22}$ | $E_1$ | $E_2$ | $E_3$ | $E_4$ | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ |
| 1 | OFF | OFF | OFF | OFF | 0 | 0 | 0 | 0 | 1 | 0 | 1 | 0 | 1 | 0 | 1 | 0 | 1 | 0 | 1 | 0 |
| 2 | OFF | OFF | + | + | 0 | 0 | 0 | 1 | 1 | 0 | 1 | 1 | 0 | 0 | 1 | 0 | 1 | 1 | 0 | 0 |
| 3 | OFF | OFF | + | − | 0 | 0 | 1 | 0 | 1 | 0 | 1 | 1 | 0 | 0 | 1 | 0 | 0 | 0 | 1 | 1 |
| 4 | OFF | OFF | − | + | 0 | 0 | 1 | 1 | 1 | 0 | 0 | 0 | 1 | 1 | 1 | 0 | 1 | 1 | 0 | 0 |
| 5 | OFF | OFF | − | − | 0 | 1 | 0 | 0 | 1 | 0 | 0 | 0 | 1 | 1 | 1 | 0 | 0 | 0 | 1 | 1 |
| 6 | OFF | OFF | CC | CC | 0 | 1 | 0 | 1 | 1 | 0 | 1 | 1 | 1 | 1 | 1 | 0 | 1 | 1 | 1 | 1 |
| 7 | + | + | OFF | OFF | 0 | 1 | 1 | 0 | 1 | 1 | 1 | 0 | 0 | 0 | 1 | 1 | 1 | 0 | 0 | 0 |
| 8 | + | − | OFF | OFF | 0 | 1 | 1 | 1 | 1 | 1 | 1 | 0 | 0 | 0 | 0 | 0 | 1 | 0 | 1 | 1 |
| 9 | − | + | OFF | OFF | 1 | 0 | 0 | 0 | 0 | 0 | 1 | 0 | 1 | 1 | 1 | 1 | 1 | 0 | 0 | 0 |
| 10 | − | − | OFF | OFF | 1 | 0 | 0 | 1 | 0 | 0 | 1 | 0 | 1 | 1 | 0 | 0 | 1 | 0 | 1 | 1 |
| 11 | CC | CC | OFF | OFF | 1 | 0 | 1 | 0 | 1 | 1 | 1 | 0 | 1 | 1 | 1 | 1 | 1 | 0 | 1 | 1 |

In this table, the four columns entitled together "STATES" point out the various possible combinations of states for the four coils $B_{11}$, $B_{12}$, $B_{21}$, $B_{22}$. In these columns "OFF" means that the designated coil is open, "CC" means that the coil is being short-circuited, "+" and "−" that a positive or negative current, respectively, is flowing in the coil.

The four columns designated as "INPUTS" provide an example of combinations for four logic signals which are applied to inputs E1 through E4, of memory 4.

Finally, the twelve columns entitled "OUTPUTS" indicate the logic states which the outputs $S_1$ through $S_{12}$ of the memory 4 assume for each combination of input logic states.

It is clear that this table is supplied only as an illustration and that there are many other possibilities for control of the two motors.

For instance, as it has already been stated, we might short-circuit only one coil per motor instead of two, which might imply alteration of the 6th and 11th lines of the table. These lines could be eliminated altogether if we did not have to short-circuit the coils after the driving pulses.

Furthermore, it seems advantageous to make the two motors operate almost at the same time, or to apply driving pulses to the coils of one of the motors while the coils of the other motor are still short-circuited. The modification to effect this function should be apparent to those skilled in the art.

It is also possible to short-circuit the coils of each motor for the entire length of time which separates two successive driving pulses. As in the previous case, for each driving circuit $C_1$, $C_2$, the short-circuiting of a coil must take place either through P type transistors, or through N type transistors, to the drains of which this coil is connected, according to the direction of the current in the other coil, when the latter is not short-circuited. For the various options which have just been envisioned as well as for a number of others the number of combinations of states for the coils does not exceed sixteen and a four input memory is enough. However, it may be that we are forced to provide for at least an additional input. For instance, it is possible to control the motors by not reversing suddenly the current in one of the coils but by interrupting it first for awhile. If, while remaining in the basic case where the coils of one of the motors are supplied while the coils of the other are open after having been short-circuited, this possibility is used, we must add to the above table eight additional states for the coils and for the outputs of the memory. "OFF", "OFF", "+", "OFF" is an example of those additional states which must be provided for the coils.

Naturally, the invention is not restricted to the particular implementation mode which has just been described.

For instance, it is possible to replace the MOS transistors of the two driving circuits with bipolar transistors, especially in the case of a non watchmaking application.

We claim:

1. A control device for two bidirectional step motors, each with a first and second coil, which includes:

two supply terminals ($b_1$, $b_2$) adapted for connection to terminals of an electric energy source;

a first driving circuit ($C_1$) which includes three circuit branches that are parallel connected between said supply terminals, each circuit branch including two series transistors ($T_{11}$–$T_{16}$) which can be controlled to apply current pulses of controlled polarity to the first coils ($B_{11}$, $B_{21}$) of the step motors, said first coils being connected, on the one hand, both connected to the junction of the transistors of one of the branches and, on the other hand, respectively connected to the junctions of the transistors of the two other branches;

a second driving circuit ($C_2$) which also includes three branches that are parallel connected between said supply terminals, each circuit branch including two series transistors ($T_{21}$–$T_{26}$) that can be controlled to apply current impulses of controlled polarity to the second coils ($B_{12}$, $B_{22}$) of the step motors, said second coils being, on the one hand, both connected to the junction of the transistors of one of the branches of that second circuit and, on the other hand, respectively connected to the junctions of the transistors of the two other branches; and control means for individually supplying control signals to each of said transistors of the first and second driving circuits so that the two coils of a motor simultaneously receive needed current pulses to make the motor turn and so as to prevent the simultaneous application of current pulses to a coil of one of the motors and to a coil of the other.

2. The device of claim 1 in which said control means includes a read only memory with an output terminal for each of said transistors.

* * * * *